(12) United States Patent
Kim et al.

(10) Patent No.: US 11,398,631 B2
(45) Date of Patent: Jul. 26, 2022

(54) STAINLESS STEEL FOR SEPARATION PLATE OF POLYMER ELECTROLYTE MEMBRANE FUEL CELL HAVING IMPROVED HYDROPHILIC PROPERTY AND CORROSION RESISTANCE, AND MANUFACTURING METHOD THEREFOR

(71) Applicant: POSCO, Pohang-si (KR)

(72) Inventors: Jong Hee Kim, Daejeon (KR); Kwang Min Kim, Pohang-si (KR); Ki Hoon Jo, Pohang-si (KR); Bo Sung Seo, Pohang-si (KR)

(73) Assignee: POSCO, Pohang-si (KR)

( * ) Notice: Subject to any disclaimer, the term of this patent is extended or adjusted under 35 U.S.C. 154(b) by 266 days.

(21) Appl. No.: 16/063,096

(22) PCT Filed: Dec. 16, 2016

(86) PCT No.: PCT/KR2016/014827
§ 371 (c)(1),
(2) Date: Jun. 15, 2018

(87) PCT Pub. No.: WO2017/105142
PCT Pub. Date: Jun. 22, 2017

(65) Prior Publication Data
US 2020/0280075 A1  Sep. 3, 2020

(30) Foreign Application Priority Data
Dec. 17, 2015 (KR) .......................... 10-2015-0180835

(51) Int. Cl.
*H01M 8/021* (2016.01)
*H01M 8/0228* (2016.01)
(Continued)

(52) U.S. Cl.
CPC ........... *H01M 8/021* (2013.01); *C22C 38/001* (2013.01); *C22C 38/002* (2013.01); *C22C 38/02* (2013.01);
(Continued)

(58) Field of Classification Search
CPC ............... H01M 8/021; H01M 8/0228; H01M 2008/1095
See application file for complete search history.

(56) References Cited

U.S. PATENT DOCUMENTS

2011/0171564 A1* 7/2011 Blunk .................. H01M 8/021
429/518
2011/0294042 A1* 12/2011 Kim ..................... C22C 38/001
429/516
(Continued)

FOREIGN PATENT DOCUMENTS

| CN | 102272343 A | 12/2011 |
|---|---|---|
| CN | 103314475 A | 9/2013 |

(Continued)

OTHER PUBLICATIONS

Office Action issued in corresponding Chinese patent application No. 201680073382.8 dated Jul. 9, 2019.
(Continued)

*Primary Examiner* — Osei K Amponsah
(74) *Attorney, Agent, or Firm* — Morgan, Lewis & Bockius LLP (57) ABSTRACT

Provided are stainless steel for a separator of a polymer electrolyte membrane fuel cell, which exhibits enhanced hydrophilicity and enhanced corrosion resistance, and a method of manufacturing the same. In the stainless steel for a separator of a polymer electrolyte membrane fuel cell, which exhibits enhanced hydrophilicity and enhanced corrosion resistance, according to an embodiment of the present
(Continued)

invention, a ratio of Cr hydroxide/Cr oxide included in a passivation film of the stainless steel ranges from 0.5 to 1.7, and the passivation film has a contact angle (θ) of 70° or less. Thus, not only corrosion resistance may be enhanced by removing a non-conductive film formed on a surface of the stainless steel and forming a new conductive film thereon, but hydrophilicity may also be secured without additional surface treatment such as a separate coating or the like, and thus manufacturing costs may be reduced and productivity may be increased.

10 Claims, 4 Drawing Sheets

(51) Int. Cl.
    *C22C 38/00*     (2006.01)
    *C22C 38/02*     (2006.01)
    *C22C 38/04*     (2006.01)
    *C22C 38/44*     (2006.01)
    *C22C 38/46*     (2006.01)
    *C22C 38/48*     (2006.01)
    *C22C 38/50*     (2006.01)
    *C23C 22/50*     (2006.01)
    *C23C 22/73*     (2006.01)
    *C23F 17/00*     (2006.01)
    *C25F 1/06*     (2006.01)
    *C25F 3/06*     (2006.01)
    *H01M 8/10*     (2016.01)
(52) U.S. Cl.
    CPC .............. *C22C 38/04* (2013.01); *C22C 38/44* (2013.01); *C22C 38/46* (2013.01); *C22C 38/48* (2013.01); *C22C 38/50* (2013.01); *C23C 22/50* (2013.01); *C23C 22/73* (2013.01); *C23F 17/00* (2013.01); *C25F 1/06* (2013.01); *C25F 3/06* (2013.01); *H01M 8/0228* (2013.01); *H01M 2008/1095* (2013.01)

(56) References Cited

U.S. PATENT DOCUMENTS

| | | | | |
|---|---|---|---|---|
| 2013/0302718 | A1* | 11/2013 | Ide | ........................... C23C 8/80 |
| | | | | 429/509 |
| 2016/0247695 | A1* | 8/2016 | Niskanen | .......... H01L 21/02337 |

FOREIGN PATENT DOCUMENTS

| | | |
|---|---|---|
| JP | 2007-119856 A | 5/2007 |
| JP | 2009-117114 A | 5/2009 |
| JP | 2012-514297 A | 6/2012 |
| JP | 2015-069692 A | 4/2015 |
| KR | 10-2010-0080379 A | 7/2010 |
| KR | 10-2011-0139825 A | 12/2011 |
| KR | 2012-0073646 A | 7/2012 |
| KR | 10-2013-0074216 A | 7/2013 |
| KR | 10-2013-0121930 A | 11/2013 |
| KR | 10-2013-0136713 A | 12/2013 |
| KR | 10-1410478 B1 | 6/2014 |
| KR | 10-1410479 B1 | 6/2014 |
| KR | 10-2014-0081161 A | 7/2014 |

OTHER PUBLICATIONS

Office Action issued in corresponding Japanese patent application No. 2018-550318 dated Jul. 2, 2019.
Korean Office Action dated Nov. 10, 2016 issued in Korean Patent Application No. 10-2015-0180835 (with English translation).
Written Opinion and International Search Report dated Mar. 6, 2017 issued in International Patent Application No. PCT/KR2017/014827 (with English translation).
Korean Notice of Allowance dated Apr. 15, 2017 issued in Korean Patent Application No. 10-2015-0180835 (with English translation).
Extended European Search Report dated Nov. 13, 2018 issued in European Patent Application No. 16876084.1.
Extended European Search Report dated Jul. 15, 2021 issued in European Patent Application No. 21172679.9.

* cited by examiner

STAINLESS STEEL FOR SEPARATION PLATE OF POLYMER ELECTROLYTE MEMBRANE FUEL CELL HAVING IMPROVED HYDROPHILIC PROPERTY AND CORROSION RESISTANCE, AND MANUFACTURING METHOD THEREFOR

CROSS REFERENCE

This patent application is the U.S. National Phase under 35 U.S.C. § 371 of International Application No. PCT/KR2016/014827, filed on Dec. 16, 2016, which claims the benefit of Korean Patent Application No. 10-2015-0180835, filed on Dec. 17, 2015, the entire contents of each are hereby incorporated by reference.

TECHNICAL FIELD

The present invention relates to stainless steel for a separator of a polymer electrolyte membrane fuel cell, which exhibits enhanced hydrophilicity and enhanced corrosion resistance, and a method of manufacturing the same, and more particularly, to stainless steel for a separator of a polymer electrolyte membrane fuel cell, which not only exhibits enhanced corrosion resistance by removing a non-conductive film formed on a surface of stainless steel and forming a new conductive film thereon, but is also capable of securing hydrophilicity even without additional surface treatment such as a separate coating, or the like, and a method of manufacturing the same.

BACKGROUND ART

Polymer electrolyte membrane fuel cells use, as an electrolyte, a polymer membrane having proton exchange properties, and have a lower operating temperature, i.e., about 80° C., and higher efficiency than those of other fuel cells. In addition, these polymer electrolyte membrane fuel cells have fast ignition, high output density, and a simple main body structure, and thus can be used for automobiles, home use, and the like.

A polymer electrolyte membrane fuel cell has a unit cell structure in which a gas diffusion layer and a separator are stacked on opposite sides of a membrane electrode assembly (MEA) including an electrolyte, an anode, and a cathode, and a structure obtained by connecting a plurality of these unit cells in series is referred to as a fuel cell stack.

The separator supplies a fuel (hydrogen or reformed gas) and an oxidant (oxygen and air) to respective fuel cell electrodes, has a flow channel configured to discharge water, which is an electrochemical reaction product, mechanically supports the MEA and the gas diffusion layer, and performs a function of electrically connecting neighboring unit cells.

Conventionally, a graphite material is used as a material of such a separator, but recently, stainless steel is widely used in consideration of manufacturing costs, weight, and the like. A suitable stainless steel material should have high corrosion resistance in a strong acid environment, which is a fuel cell operating environment, and in terms of weight reduction, miniaturization, and mass production, stainless steel with high corrosion resistance and high conductivity should be used.

The flow channel of a separator for a fuel cell includes a channel through which a fuel or an oxidant passes and a land that comes into contact with a gas diffusion layer and acts as an electrical path, and for the smooth supply of reactants and the smooth discharge of a reaction product, it is very important to control a shape and surface state of the flow channel.

Generally, in a polymer electrolyte membrane fuel cell, to enhance proton conductivity of an electrolyte membrane, reaction gases (a fuel and an oxidant) are supplied after being humidified to a certain level or more.

Meanwhile, water is produced on the cathode side by an electrochemical reaction, and thus when a dew point temperature of the reaction gas is higher than an operating temperature of a fuel cell, water droplets are generated by water vapor condensation in the channels, gas diffusion layer, or electrodes.

This is referred to as flooding, and the flooding phenomenon causes a lack of reaction gas at an electrode due to non-uniform flowing of a reaction gas and insufficient diffusion of the reaction gas, resulting in deteriorated performance of a fuel cell.

The flooding phenomenon may occur not only at a cathode but also at an anode due to water transferred through an electrolyte membrane. In particular, when a gas flow channel is clogged by condensation water on the anode side, a lack of fuel gas is caused, resulting in irreversible damage to an electrode.

Such phenomenon occurs because when a load current is forcibly supplied in a state of an insufficient fuel gas, catalyst-carrying carbon of an anode reacts with water to produce electrons and protons in a fuel-free state.

As a result of such reaction, loss of a catalyst occurs on the anode side and a reduction in an effective electrode area is caused, resulting in deteriorated fuel cell performance.

To prevent the flooding phenomenon and stabilize fuel cell performance, it is necessary to perform treatment for satisfactorily discharging water by imparting hydrophilic properties to a surface.

To address these matters, conventionally, attempts have been made to enhance water discharge characteristics by molding a separator and then forming a scratch through mechanical friction on a surface of a land, but when this method is used, manufacturing costs may be increased due to an additional process of forming a scratch or it may be impossible to secure scratch uniformity.

On the other hand, there is a method of performing surface hydrophilization through plasma treatment after a coating process, but it is disadvantageous in that manufacturing costs are increased by the additional plasma treatment process after the coating process.

Alternatively, to secure hydrophilicity, there is a method of forming a precious metal (Au) or titanium oxide ($TiO_2$) on a final product, but in this case, coating costs are increased and the molded separator should be coated in a sheet form, and thus manufacturing costs increase and there are limitations in commercialization of this method.

In addition, to secure a hydrophilic surface, a method of forming a Si-rich layer on a surface has been attempted, but the Si-rich layer reduces the conductivity of a separator for a fuel cell when a Si oxide, which is an insulating material, is formed, and thus it is not suitable for use as a material of a separator for a fuel cell.

(Patent Document 0001) Korean Patent Registration No. 10-1410479

(Patent Document 0002) Korean Patent Publication No. 10-2013-0136713

DISCLOSURE

Technical Problem

Embodiments of the present invention are to provide stainless steel for a separator of a polymer electrolyte membrane fuel cell, which not only exhibits enhanced corrosion resistance by removing a non-conductive film formed on a surface of stainless steel and forming a new conductive film thereon, but is also capable of securing hydrophilicity even without additional surface treatment such as a separate coating, or the like.

In addition, according to the present invention, there is provided a method of manufacturing the stainless steel for a separator of a polymer electrolyte membrane fuel cell.

Technical Solution

According to an embodiment of the present invention, stainless steel for a separator of a polymer electrolyte membrane fuel cell includes, based on wt %, greater than 0% to 0.02% of C, greater than 0% to 0.02% of N, greater than 0% to 0.25% of Si, greater than 0% to 0.2% of Mn, greater than 0% to 0.04% of P, greater than 0% to 0.02% of S, 20% to 34% of Cr, greater than 0% to 0.6% of V, greater than 0% to 0.5% of Ti, greater than 0% to 0.5% of Nb, and the remainder, Fe and other unavoidable impurities, wherein a ratio of Cr hydroxide/Cr oxide included in a passivation film of the stainless steel ranges from 0.5 to 1.7, and the passivation film has a contact angle (θ) of 70° or less.

In addition, according to one embodiment of the present invention, the stainless steel may have a surface roughness (Ra) of 0.02 μm to 0.5 μm.

In addition, according to one embodiment of the present invention, the surface roughness (Ra) may be an average value of surface roughness in a rolling longitudinal direction and surface roughness in a rolling transverse direction.

In addition, according to one embodiment of the present invention, the stainless steel may further include 0.05% to 2.5% of Mo.

In addition, according to one embodiment of the present invention, the passivation film may have a thickness of 3.5 nm or less (excluding 0).

In addition, according to one embodiment of the present invention, the passivation film may have a corrosion potential of 0.3 V (SCE) or more.

According to a method of manufacturing a stainless steel for a separator of a polymer electrolyte membrane fuel cell according to an embodiment of the present invention, a stainless steel sheet is manufactured by performing cold rolling on stainless steel including, based on wt %, greater than 0% to 0.02% of C, greater than 0% to 0.02% of N, greater than 0% to 0.25% of Si, greater than 0% to 0.2% of Mn, greater than 0% to 0.04% of P, greater than 0% to 0.02% of S, 20% to 34% of Cr, greater than 0% to 0.6% of V, greater than 0% to 0.5% of Ti, greater than 0% to 0.5% of Nb, and the remainder, Fe and other unavoidable impurities. Subsequently, a heat treatment process of forming a first passivation film on a surface of the stainless steel sheet by performing bright annealing on the stainless steel plate is performed, and a film reforming process of forming a second passivation film on the surface of the stainless steel sheet by reforming the first passivation film is performed. At this time, a ratio of Cr hydroxide/Cr oxide included in the second passivation film ranges from 0.5 to 1.7, and the second passivation film has a contact angle (θ) of 70° or less.

In addition, according to one embodiment of the present invention, the film reforming process may include a first film reforming process, a second film reforming process, and a third film reforming process. In the first film reforming process, electrolytic treatment is performed in a sulfuric acid solution at a first current density. In the second film reforming process, electrolytic treatment is performed in the sulfuric acid solution at a second current density that is equal to or less than the first current density. In the third film reforming process, immersion is performed in a mixed acid solution including nitric acid and hydrofluoric acid. The first film reforming process and the second film reforming process may be consecutively performed.

In addition, according to one embodiment of the present invention, in the first film reforming process, a potential of the stainless steel sheet, which corresponds to the first current density, may satisfy Equations 1 and 2 below:

$$E_{cathode} \geq 1.0 \quad (1)$$

$$|E_{cathode}| + |E_{anode}| \geq 2.0 \quad (2)$$

In addition, according to one embodiment of the present invention, in the first film reforming process and the second film reforming process, a concentration of the sulfuric acid solution may range from 50 g/l to 300 g/l, and a temperature of the sulfuric acid solution may range from 40° C. to 80° C.

In addition, according to one embodiment of the present invention, in the third film reforming process, a concentration of the nitric acid in the mixed acid solution may range from 100 g/l to 200 g/l, a concentration of the hydrofluoric acid may be 70 g/l or less, and a temperature of the mixed acid solution may range from 40° C. to 60° C.

Advantageous Effects

According to embodiments of the present invention, not only corrosion resistance can be enhanced by removing a non-conductive film formed on a surface of stainless steel and forming a new conductive film thereon, but hydrophilicity can also be secured without additional surface treatment such as a separate coating or the like, and thus manufacturing costs can be reduced and productivity can be increased. In addition, since hydrophilicity of the surface of stainless steel for a separator of a polymer electrolyte membrane fuel cell can be secured, water discharge characteristics can be enhanced when the stainless steel is applied to a separator for a fuel cell, and thus a reduction in performance of a fuel cell due to a flooding phenomenon may be suppressed.

BEST MODE

Stainless steel for a separator of a polymer electrolyte membrane fuel cell according to an embodiment of the present invention includes, based on wt %, greater than 0% to 0.02% of C, greater than 0% to 0.02% of N, greater than 0% to 0.25% of Si, greater than 0% to 0.2% of Mn, greater than 0% to 0.04% of P, greater than 0% to 0.02% of S, 20% to 34% of Cr, greater than 0% to 0.6% of V, greater than 0% to 0.5% of Ti, greater than 0% to 0.5% of Nb, and the remainder, Fe and other unavoidable impurities, wherein a ratio of Cr hydroxide/Cr oxide included in a passivation film of the stainless steel ranges from 0.5 to 1.7, and the passivation film has a contact angle ($\theta$) of 70° or less.

MODE OF THE INVENTION

Hereinafter, embodiments of the present invention will be described in detail with reference to the accompanying drawings. However, the embodiments described below are provided merely to fully convey the concept of the invention to one of ordinary skill in the art. The present invention may be embodied in many different forms and should not be construed as being limited to the embodiments set forth herein. In the drawings, illustration of portions irrelevant to the description of the present invention will be omitted for clarity, and sizes of components may be exaggerated for convenience of understanding.

Figure 1:
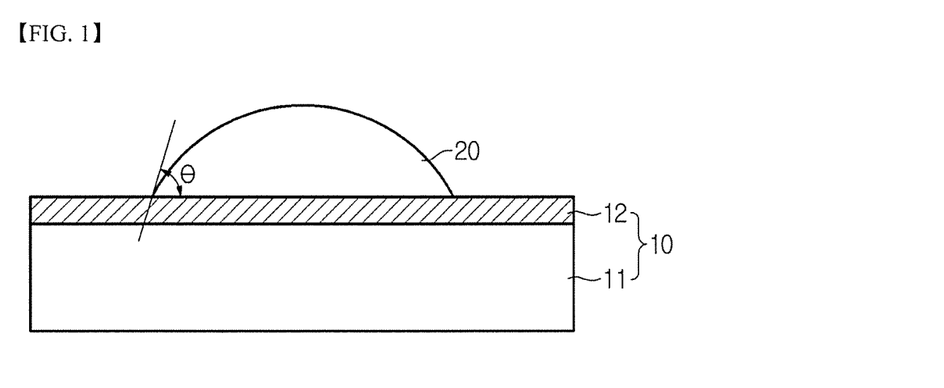
FIG. 1 is a cross-sectional view for explaining a contact angle of a water droplet with respect to stainless steel for a separator of a polymer electrolyte membrane fuel cell according to an embodiment of the present invention.

FIG. 1 is a cross-sectional view for explaining a contact angle of a water droplet of stainless steel 10 for a separator of a polymer electrolyte membrane fuel cell according to an embodiment of the present invention.

The stainless steel 10 for a separator of a polymer electrolyte membrane fuel cell includes a stainless steel base 11 and a passivation film 12 formed on the stainless steel base 11.

The stainless steel 10 includes, based on wt %, greater than 0% to 0.02% of C, greater than 0% to 0.02% of N, greater than 0% to 0.25% of Si, greater than 0% to 0.2% of Mn, greater than 0% to 0.04% of P, greater than 0% to 0.02% of S, 20% to 34% of Cr, greater than 0% to 0.6% of V, greater than 0% to 0.5% of Ti, greater than 0% to 0.5% of Nb, and the remainder, Fe and other unavoidable impurities.

Hereinafter, a reason for numerical limitation of amounts of components in embodiments according to the present invention will be described below. In the following description, unit is weight % (wt %) unless otherwise stated herein.

Carbon (C) and nitrogen (N) form chromium (Cr) carbonitride in steel, and as a result, corrosion resistance of a Cr-free layer is reduced, and thus the smaller the amounts of both elements, the better the effect. Thus, in the present invention, it is preferably that amounts of C and N are limited to 0.02% or less (excluding 0) and 0.02% or less (excluding 0).

Although silicon (Si) is an element effective for deoxidization, Si inhibits toughness and formability, and $SiO_2$ oxide generated during annealing also deteriorates the conductivity and hydrophilicity of a product, and thus, in the present invention, the amount of Si may be limited to 0.25% or less.

Although manganese (Mn) is an element for increasing deoxidization, MnS, which is an inclusion, reduces corrosion resistance, and thus in the present invention, the amount of Mn may be limited to 0.2% or less.

Phosphorus (P) reduces not only corrosion resistance but also toughness, and thus in the present invention, the amount of P may be limited to 0.04% or less.

Sulfur (S) forms MnS, and such MnS acts as an origin of corrosion and thus reduces corrosion resistance. Thus, in the present invention, the amount of S may be limited to 0.02% or less in consideration of this.

Chromium (Cr) is an element that is effective in the formation of a Cr hydroxide effective for hydrophilicity and prevents the elution of Fe in an acid atmosphere, which is a fuel cell operating environment, thereby increasing corrosion resistance, but when added in an excess amount, Cr reduces toughness, and thus, in the present invention, the amount of Cr may be limited to a range of 20% to 34% in consideration of this.

Vanadium (V) is effective in reducing the elution of Fe in a fuel cell operating environment, but when added in an excess amount, V inhibits toughness, and thus in the present invention, the amount of V may be limited to a range of greater than 0% to 0.6% in consideration of this.

Although titanium (Ti) and niobium (Nb) are elements effective in forming a carbonitride from carbon (C) and nitrogen (N) in steel, Ti and Nb reduce toughness, and thus in the present invention, the amounts of Ti and Nb may be limited to 0.5% or less in consideration of this.

However, since Cu is an element, the formability of which may deteriorate due to solid solution strengthening and Ni is an element, the elution and formability of which may be reduced when added in a trace amount, Cu and Ni are managed as impurities in the present invention.

According to one embodiment of the present invention, the stainless steel 10 may further include 0.05% to 2.5% of Mo.

Molybdenum (Mo), which is an element for increasing corrosion resistance of the stainless steel, may be additionally added, and when added in an excess amount, toughness and hydrophilicity may be slightly reduced, and thus in the present invention, the amount of Mo may be limited to a range of 0.05% to 2.5% in consideration of this.

A ratio of Cr hydroxide/Cr oxide included in the passivation film 12 of the stainless steel 10 ranges from 0.5 to 1.7. In this regard, the Cr hydroxide is $Cr(OH)_3$. Accordingly, the passivation film 12 has a contact angle ($\theta$) of 70° or less.

More specifically, in order for the stainless steel according to an embodiment of the present invention to secure hydrophilicity for preventing a flooding phenomenon during operating of a fuel cell, it is necessary to control a contact angle of the passivation film 12 formed on a surface layer of the stainless steel. Generally, the higher the hydrophobicity, the greater the contact angle, and the higher the hydrophilicity, the smaller the contact angle. In this regard, the higher the hydrophilicity of a surface of the stainless steel 10, the smaller the contact angle of the passivation film 12, and water discharge characteristics may be enhanced during operating of a fuel cell, due to an increase in hydrophilicity and, accordingly, performance of the fuel cell may be stabilized.

That is, hydrophilicity sufficient to prevent the flooding phenomenon during operating of the fuel cell may be obtained by controlling the contact angle of the passivation film 12 to 70° or less.

An increase in such hydrophilicity may be achieved by controlling components of the passivation film 12 formed on the surface layer of the stainless steel, and the ratio of Cr hydroxide/Cr oxide included in the passivation film 12 may range from 0.5 to 1.7.

Figure 2:
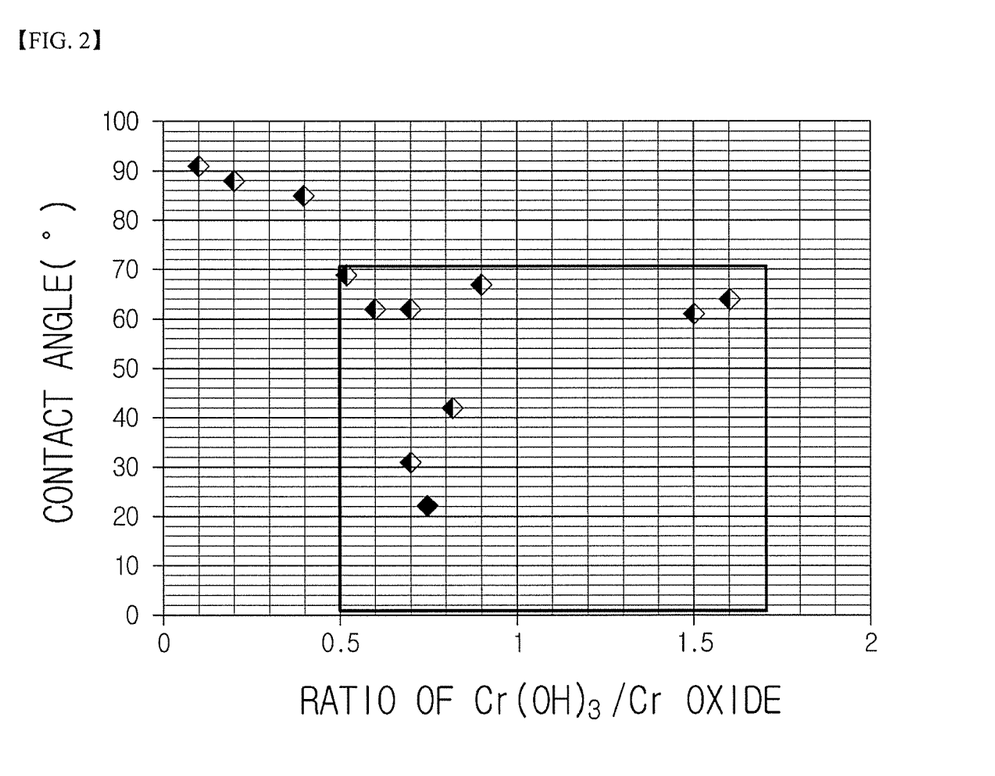
FIG. 2 is a graph for explaining the correlation between a contact angle and a ratio of Cr(OH)$_3$/Cr oxide included in a passivation film of stainless steel for a separator of a polymer electrolyte membrane fuel cell according to an embodiment of the present invention.

FIG. 2 is a graph for explaining the correlation between a contact angle and a ratio of Cr hydroxide/Cr oxide included in a passivation film of stainless steel for a separator of a polymer electrolyte membrane fuel cell according to an embodiment of the present invention.

Referring to FIG. 2, when the ratio of Cr hydroxide/Cr oxide included in the passivation film 12 is less than 0.5, the contact angle of the passivation film 12 exceeds 70° and thus it is impossible to obtain sufficient hydrophilicity to be achieved by the present invention. In addition, when the ratio of Cr hydroxide/Cr oxide included in the passivation film 12 is greater than 1.7, since the Cr hydroxide is more thermodynamically unstable than the Cr oxide, hydrophilicity is lost in a strong acid environment, which is a fuel cell operating environment. Accordingly, in the present invention, the ratio of Cr hydroxide/Cr oxide included in the passivation film 12 may be limited to a range of 0.5 to 1.7 in consideration of this.

In addition, according to one embodiment of the present invention, the stainless steel 10 may have a surface roughness (Ra) of 0.02 μm to 0.5 μm. In this regard, the surface roughness (Ra) is an average value of surface roughness in a rolling longitudinal direction and surface roughness in a rolling transverse direction.

By controlling the surface roughness of the stainless steel 10, a capillary effect may act on a water droplet according to concave and convex portions present within a certain roughness, and thus surface tension of the water droplet may be reduced, and accordingly, the contact of the passivation film 12 may be controlled to 70° or less.

Figure 3:
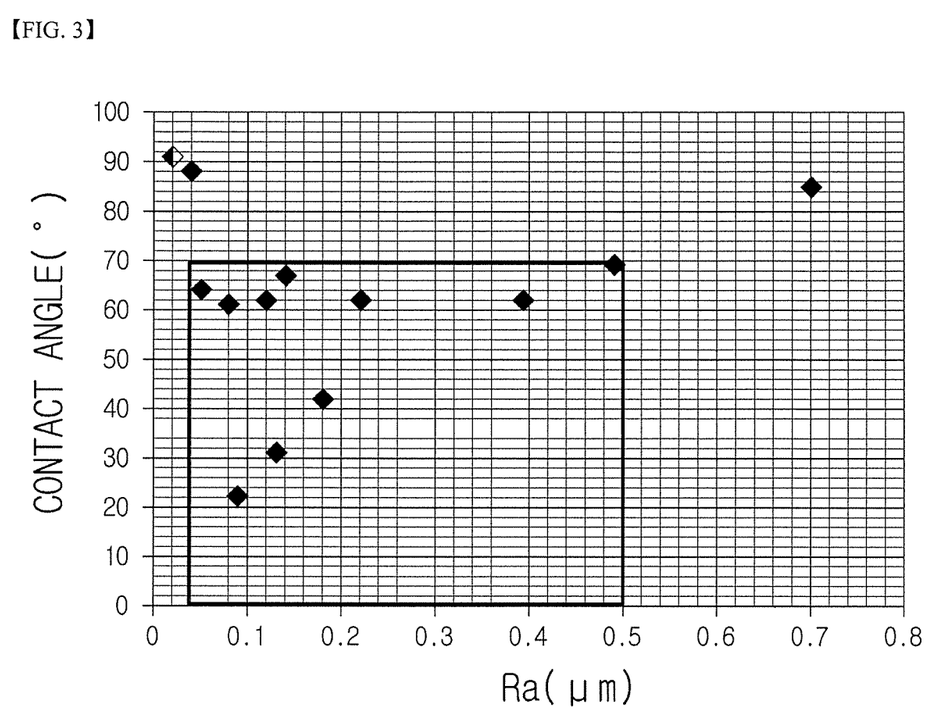
FIG. 3 is a graph for explaining the correlation between surface roughness (Ra) and a contact angle of stainless steel for a separator of a polymer electrolyte membrane fuel cell according to an embodiment of the present invention.

FIG. 3 is a graph for explaining the correlation between surface roughness (Ra) and a contact angle of stainless steel for a separator of a polymer electrolyte membrane fuel cell according to an embodiment of the present invention.

Referring to FIG. 3, when the surface roughness (Ra) of the stainless steel 10 is less than 0.02 μm or greater than 0.5 μm, there is a limitation in reducing the surface tension of water and the contact angle of the passivation film 12 exceeds 70°, and thus it is impossible to obtain sufficient hydrophilicity to be achieved by the present invention.

For example, the passivation film 12 may have a thickness of 3.5 nm or less (excluding 0). A general stainless steel cold-rolled sheet has an increased interfacial contact resistance due to a passivation film having a thickness of several nanometers, formed on a surface thereof. The passivation film 12 of the stainless steel 10 according to an embodiment of the present invention may be thinned to a thickness of 3.5 nm or less, and thus an effect of reducing contact resistance is obtained through thinning of a passivation film having semiconductor characteristics close to general insulating properties.

For example, the passivation film 12 may have a corrosion potential of 0.3 V (SCE) or more. Corrosion potential evaluation was performed by cutting the manufactured steel material having a thickness of 0.1 mm into an area of $cm^2$ and immersion thereof in a mixture of a 1M sulfuric acid solution and a 2 ppm hydrofluoric acid solution, which is a fuel cell operating environment, at 70 □ and evaluating the potential of the steel material with respect to a saturated calomel electrode (SCE) as a reference electrode. That is, the stainless steel according to an embodiment of the present invention may have a corrosion potential of 0.3 V (SCE) or more with respect to a saturated calomel electrode (SCE) as a reference electrode.

Figure 4:
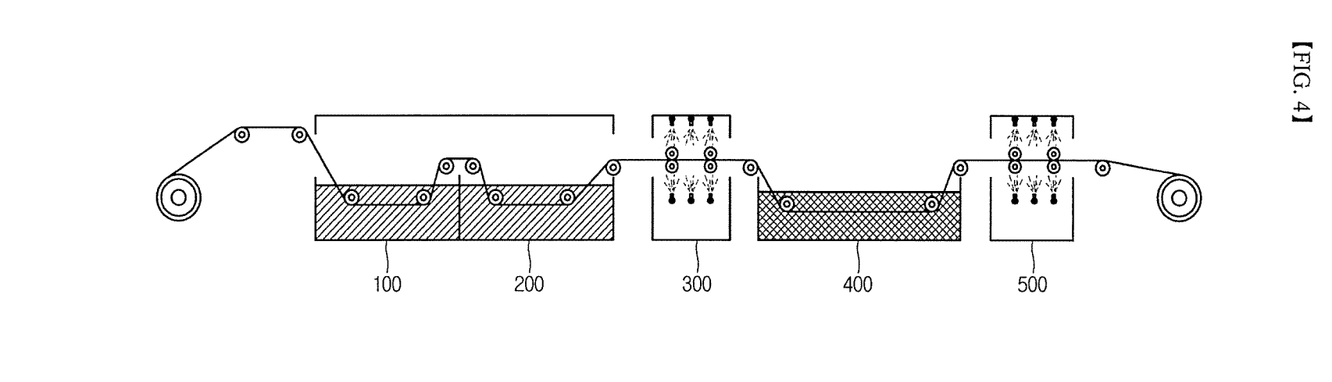
FIG. 4 is a schematic view of equipment for manufacturing stainless steel for a separator of a polymer electrolyte membrane fuel cell according to an embodiment of the present invention.

FIG. 4 is a schematic view of equipment for manufacturing stainless steel for a separator of a polymer electrolyte membrane fuel cell according to an embodiment of the present invention.

Hereinafter, a method of manufacturing stainless steel for a separator of a polymer electrolyte membrane fuel cell according to an embodiment of the present invention will be described in detail with reference to FIG. 4.

Stainless steel is subjected to cold rolling to manufacture a stainless steel sheet. Subsequently, a heat treatment process of forming a first passivation film on a surface of the stainless steel sheet by performing bright annealing on the stainless steel sheet is performed.

Bright annealing heat treatment is performed in a reducing atmosphere, and thus a stainless steel plate, on which a passivation film having a smooth surface state and a thickness of several nanometers is formed instead of a high temperature oxidation scale form having a thickness of several micrometers formed in a general oxidizing atmosphere, is manufactured. However, the passivation film having a thickness of several nanometers formed during bright annealing heat treatment exhibits high electrical resistivity properties due to semiconductor characteristics, and when used in a separator of a fuel cell, the passivation film may deteriorate performance of a fuel cell due to high interfacial contact resistance. Thus, it is necessary to additionally perform a post-treatment process of enhancing interfacial contact resistance and corrosion resistance of the passivation film formed during bright annealing heat treatment.

The stainless steel sheet includes, based on wt %, greater than 0% to 0.02% of C, greater than 0% to 0.02% of N, greater than 0% to 0.25% of Si, greater than 0% to 0.2% of Mn, greater than 0% to 0.04% of P, greater than 0% to 0.02% of S, 20% to 34% of Cr, greater than 0% to 0.6% of V, greater than 0% to 0.5% of Ti, greater than 0% to 0.5% of Nb, and the remainder, Fe and other unavoidable impurities, and detailed description of these elements has already been provided.

Accordingly, in the stainless steel for a separator of a polymer electrolyte membrane fuel cell according to the present invention, a thin-film-type hydrophilic and conductive passivation film may be formed through the following process.

To form the conductive passivation film, the first passivation film is reformed to form the second passivation film 12 on a surface of the stainless steel sheet.

The first passivation film is subjected to first film reforming (100) by electrolytic treatment in the sulfuric acid solution at a first current density, second film reforming (200) is performed by electrolytic treatment in the sulfuric acid solution at a second current density that is equal to or less than the first current density, and third film reforming (400) is performed by immersion in a mixed acid solution including nitric acid and hydrofluoric acid.

In this regard, the first film reforming process (100) and the second film reforming process (200) may be consecutively performed.

That is, when the stainless steel sheet with the first passivation film formed thereon is subjected to the first film reforming process (100), the first passivation film is removed. When the stainless steel sheet from which the first passivation film is removed is subjected to the second film reforming process (200), iron (Fe) may be selectively eluted adjacent to the surface of the stainless steel sheet, and thus chromium (Cr) may be concentrated on the surface of the stainless steel sheet, thereby forming a Cr-rich layer.

Both the first film reforming process (100) and the second film reforming process (200) are performed by electrolytic treatment in the sulfuric acid solution, the first film reforming process (100) is performed by electrolytic treatment at a first current density, and the second film reforming process (200) is performed by electrolytic treatment at a second current density that is equal to or less than the first current density.

In the first film reforming process (100), a potential of the stainless steel sheet, which corresponds to the first current density, satisfies Equations 1 and 2 below.

$$E_{cathode} \geq 1.0 \tag{1}$$

$$|E_{cathode}| + |E_{anode}| \geq 2.0 \tag{2}$$

In the first film reforming process (100), the first current density that is a sum of absolute values of $E_{cathode}$ and $E_{anode}$ of 2.0 V (SCE) or more during cross electrolytic treatment of an anode and a cathode, or a $E_{cathode}$ of 1.0 V (SCE) or more during electrolytic treatment of a cathode alone may be applied.

When the sum of absolute values of $E_{cathode}$ and $E_{anode}$ is 2.0 V (SCE) or more or the $E_{cathode}$ value is 1.0 V (SCE) or more, cathode dissolution of the stainless steel sheet occurs in a high potential region, i.e., +1.0 V (SCE) or more, and thus dissolution of the passivation film uniformly occurs entirely on the surface of the stainless steel sheet. Thus, corrosion of the stainless steel sheet may be suppressed and the non-conductive passivation film may be uniformly removed. At this time, when the sum of absolute values of $E_{cathode}$ and $E_{anode}$ is less than 2.0 V (SCE) or the $E_{cathode}$ value is less than 1.0 V (SCE), the passivation film is not uniformly removed, and thus a contact resistance reduction efficiency may be reduced.

For example, in the first film reforming process (100), a concentration of the sulfuric acid solution may range from 50 g/l to 300 g/l, and a temperature of the sulfuric acid solution may be adjusted to 40° C. to 80° C.

When the concentration of the sulfuric acid solution is less than 50 g/l, the brightly annealed first passivation film on the surface of the stainless steel sheet may be insufficiently removed. In addition, although the concentration of the sulfuric acid solution is greater than 300 g/l, an effect of removing the first passivation film is saturated, and thus the concentration of the sulfuric acid solution may be controlled to 300 g/l or less in consideration of economic efficiency of electrolytic treatment.

When the temperature of the sulfuric acid solution is less than 40° C., an effect of removing the passivation film is reduced, and an upper limit of the temperature of the sulfuric acid solution may be limited to 80° C. in consideration of safety.

After the first film reforming process (100), a process of increasing the percentage of Cr on the surface of the stainless steel sheet by further performing electrolytic treatment on the stainless steel sheet from which the first passivation film is removed, in the sulfuric acid solution, i.e., the second film reforming process (200), is performed.

The second current density, which is a current density of the second film reforming process (200), may be equal to or less than the first current density, which is a current density of the first film reforming process (100). More preferably, the second current density, which is a current density of the second film reforming process (200), may be lower than the first current density, which is a current density of the first film reforming process (100).

In the first film reforming process (100), the brightly annealed first passivation film has been removed and thus the second film reforming process (200) is performed in a state in which the stainless steel base is exposed. Thus, when the current density of the second film reforming process (200) is higher than that of the first film reforming process (100), severe elution of the base occurs and thus it is difficult to anticipate a surface Cr percentage increase effect. Thus, in the second film reforming process (200), an appropriate amount of Fe may be selectively eluted by applying a lower current density than that in the first film reforming process 100, and thus the percentage of Cr on the surface may be increased, resulting in an increased percentage of Cr on the surface of the stainless steel base.

For example, in the second film reforming process (200), a concentration of the sulfuric acid solution ranges from 50 g/l to 300 g/l, and a temperature of the sulfuric acid solution may be adjusted to 40° C. to 80° C.

When the concentration of the sulfuric acid solution is less than 50 g/l, a selective elution amount of Fe of the stainless steel base is so small that an increase in the percentage of Cr on the surface thereof may be insufficient. In addition, when the concentration of the sulfuric acid solution exceeds 300 g/l, corrosion of the stainless steel base is severe, and thus it is difficult to anticipate a surface Cr percentage increase effect.

When the temperature of the sulfuric acid solution is less than 40° C., the surface Cr percentage increase effect is reduced, and an upper limit of the temperature of the sulfuric acid solution may be limited to 80° C. in consideration of safety.

In addition, while the first film reforming process (100) and the second film reforming process (200) are performed, a flow of the sulfuric acid solution inside an electrolytic bath that accommodates the sulfuric acid solution may be generated to remove air bubbles generated on surfaces of electrodes and the stainless steel sheet.

In the first film reforming process (100) and the second film reforming process (200), the air bubbles generated on surfaces of electrodes and the stainless steel sheet during electrolytic treatment reduce efficiency of the electrolytic treatment, and may be a main cause of stains or marks on the surface of the stainless steel. Thus, it is preferable to remove air bubbles generated during electrolytic treatment. By generating a flow of a solution inside an electrolytic bath during electrolytic treatment, the air bubbles generated on surfaces of electrodes and the stainless steel sheet may be mechanically removed. As a method of generating a flow of a solution inside an electrolytic bath, the sulfuric acid solution may be circulated using a pump and sprayed via nozzles towards the surfaces of electrodes and the stainless steel sheet.

Meanwhile, the method of manufacturing stainless steel for a separator of a polymer electrolyte membrane fuel cell according to an embodiment of the present invention further includes, after the second film reforming process (200), forming a new film by immersion in a mixture of a nitric acid solution and a hydrofluoric acid solution (process 400). That is, the first passivation film is removed, and through the third film reforming process (400) in which the stainless steel base with the Cr-rich layer formed thereon is immersed in a mixed acid solution including nitric acid and hydrofluoric acid, the second passivation film 12 is formed again.

For example, in the third film reforming process (400), the concentration of nitric acid in the mixed acid solution ranges from 100 g/l to 200 g/l, the concentration of hydrofluoric acid in the mixed acid solution is 70 g/l or less, and the temperature of the solution may range from 40° C. to 60° C.

In the third film reforming process (400), at an initial stage of immersion in a mixed acid solution, Fe of the stainless steel base is selectively eluted and an insoluble Si oxide remaining on the surface thereof is dissolved, and as a result, an increase in the percentage of Cr on the surface of the base is shown. At a late stage of immersion, the second passivation film 12, which is a new film formed by the concentrated Cr, is formed and through this, a surface potential of the stainless steel sheet is increased.

When the concentration of nitric acid in the mixed acid solution is too low, an effect of increasing the percentage of Cr on the surface of the base or an effect of forming a new passivation film is low and thus a contact resistance reduction effect is reduced. Even though the concentration of nitric acid in the mixed acid solution is significantly increased, an effect of increasing the percentage of Cr on the surface of the base is saturated, or corrosion of the stainless steel base is rather severe, and thus a contact resistance reduction effect is reduced and, accordingly, the concentration of nitric acid in the mixed acid solution may be limited to a range of 100 g/l to 200 g/l.

In the third film reforming process (400), the insoluble oxide that has not been removed in the previous process may be removed through direct dissolution due to hydrofluoric acid or detachment along with elution of the stainless steel base. In addition, hydrofluoric acid aids in removing metal ions through reaction with eluted metal ions and thus increases an effect of nitric acid. Thus, when the insoluble oxide is not present or the effect of nitric acid can be sufficiently exhibited, in the third film reforming process (400), the concentration of hydrofluoric acid is set to 0. When the concentration of the hydrofluoric acid is too high, corrosion of the stainless steel base becomes severe, and thus an upper limit of the concentration of the hydrofluoric acid may be adjusted to 70 g/l.

In the third film reforming process (400), when the temperature of the mixed acid solution is less than 40° C. or greater than 60° C., an effect of forming a new passivation film is reduced, and thus it is preferable to limit the temperature range of the mixed acid solution.

When the temperature of the sulfuric acid solution is less than 40° C., passivation film removal efficiency is reduced, and an upper limit of the temperature of the sulfuric acid solution may be limited to 80° C. in consideration of safety.

Subsequently, the stainless steel sheet may be washed with water and hot-air dried at a temperature of 300° C. or less.

Accordingly, the ratio of Cr hydroxide/Cr oxide included in the newly formed second passivation film 12 may be controlled to 0.5 to 1.7. In addition, the surface roughness (Ra) of the second passivation film 12 may be controlled to 0.02 μm to 0.5 μm. In this regard, the surface roughness (Ra) refers to an average value of surface roughness in a rolling longitudinal direction and surface roughness in a rolling transverse direction. Accordingly, the contact angle of the passivation film 12 may be controlled to 70° or less and as a result, sufficient hydrophilicity to be achieved by the present invention may be obtained.

In addition, interfacial contact resistance at a contact pressure of 100 N/cm$^2$ may be controlled to 10 mΩ cm$^2$ or less, and a corrosion potential of 0.3 V (SCE) or more may be secured, and accordingly, a target value or less for commercialization of a separator of a fuel cell may be achieved.

That is, the stainless steel for a separator of a polymer electrolyte membrane fuel cell according to an embodiment of the present invention may include a passivation film with hydrophilicity, conductivity, and corrosion resistance.

Hereinafter, the present invention will be described in further detail with reference to the following examples.

Inventive Steel

Inventive steels 1 to 3 according to embodiments of the present invention include compositions shown in Table 1 below, and were fabricated into a cold-rolled sheet form having a thickness of 0.1 mm by preparation into a slab through continuous casting, and then hot rolling and cold rolling.

TABLE 1

|  | C | N | Si | Mn | P | S | Cr | Mo | Ni | V | Ti | Nb |
|---|---|---|---|---|---|---|---|---|---|---|---|---|
| Inventive steel 1 | 0.009 | 0.01 | 0.15 | 0.14 | 0.009 | 0.008 | 23 | — | — | 0.1 | 0.1 | 0.2 |
| Inventive steel 2 | 0.01 | 0.011 | 0.14 | 0.12 | 0.01 | 0.009 | 28 | — | — | 0.2 | 0.15 | 0.15 |
| Inventive steel 3 | 0.008 | 0.009 | 0.11 | 0.15 | 0.03 | 0.004 | 30 | — | — | 0.42 | 0.11 | 0.25 |

Hereinafter, the present invention will be described in further detail with reference to the following examples.

Example 1

Ferrite-based stainless steel having a composition of Inventive steel 1 was subjected to cold rolling using a Z-mill cold roller, followed by bright annealing heat treatment in a reducing atmosphere containing hydrogen (75 vol %) and nitrogen (25 vol %) to obtain a cold-rolled sheet having a thickness of 0.1 mm, and the cold-rolled sheet was subjected to first and second film reforming processes in a sulfuric acid solution in accordance with conditions of Example 1 of Table 2 below, followed by third film reforming by being immersed in a mixed acid solution including nitric acid and hydrofluoric acid, and then physical properties of the resulting sheet were evaluated.

Example 2

A cold-rolled sheet having a thickness of 0.1 mm was manufactured in the same manner as in Example 1, except that the cold-rolled sheet was subjected to first and second film reforming processes in a sulfuric acid solution in accordance with conditions of Example 2 of Table 2 below, followed by third film reforming by immersion in a mixed acid solution including nitric acid and hydrofluoric acid, and then physical properties thereof were evaluated.

Example 3

A cold-rolled sheet having a thickness of 0.1 mm was manufactured in the same manner as in Example 1, except that the cold-rolled sheet was subjected to first and second film reforming processes in a sulfuric acid solution in accordance with conditions of Example 3 of Table 2 below, followed by third film reforming by immersion in a mixed acid solution including nitric acid and hydrofluoric acid, and then physical properties thereof were evaluated.

Example 4

Ferrite-based stainless steel having a composition of Inventive steel 2 was subjected to cold rolling using a Z-mill cold roller, followed by bright annealing heat treatment in a reducing atmosphere containing hydrogen (75 vol %) and nitrogen (25 vol %) to obtain a cold-rolled sheet having a thickness of 0.1 mm, and the cold-rolled sheet was subjected to first and second film reforming processes in a sulfuric acid solution in accordance with conditions of Example 1 of Table 2 below, followed by third film reforming by being immersed in a mixed acid solution including nitric acid and hydrofluoric acid, and then physical properties of the resulting sheet were evaluated.

Example 5

A cold-rolled sheet having a thickness of 0.1 mm was manufactured in the same manner as in Example 4, except that the cold-rolled sheet was subjected to first and second film reforming processes in a sulfuric acid solution in accordance with conditions of Example 5 of Table 2 below, followed by third film reforming by immersion in a mixed acid solution including nitric acid and hydrofluoric acid, and then physical properties thereof were evaluated.

Example 6

A cold-rolled sheet having a thickness of 0.1 mm was manufactured in the same manner as in Example 4, except that the cold-rolled sheet was subjected to first and second film reforming processes in a sulfuric acid solution in accordance with conditions of Example 6 of Table 2 below, followed by third film reforming by immersion in a mixed acid solution including nitric acid and hydrofluoric acid, and then physical properties thereof were evaluated.

Example 7

Ferrite-based stainless steel having a composition of Inventive steel 3 was subjected to cold rolling using a Z-mill cold roller, followed by bright annealing heat treatment in a reducing atmosphere containing hydrogen (75 vol %) and nitrogen (25 vol %) to obtain a cold-rolled sheet having a thickness of 0.1 mm, and the cold-rolled sheet was subjected to first and second film reforming processes in a sulfuric acid solution in accordance with conditions of Example 1 of Table 2 below, followed by third film reforming by being immersed in a mixed acid solution including nitric acid and hydrofluoric acid, and then physical properties of the resulting sheet were evaluated.

Example 8

A cold-rolled sheet having a thickness of 0.1 mm was manufactured in the same manner as in Example 7, except that the cold-rolled sheet was subjected to first and second film reforming processes in a sulfuric acid solution in accordance with conditions of Example 8 of Table 2 below, followed by third film reforming by immersion in a mixed acid solution including nitric acid and hydrofluoric acid, and then physical properties thereof were evaluated.

Example 9

A cold-rolled sheet having a thickness of 0.1 mm was manufactured in the same manner as in Example 7, except that the cold-rolled sheet was subjected to first and second film reforming processes in a sulfuric acid solution in accordance with conditions of Example 9 of Table 2 below, followed by third film reforming by immersion in a mixed acid solution including nitric acid and hydrofluoric acid, and then physical properties thereof were evaluated.

Comparative Example 1

A cold-rolled sheet having a thickness of 0.1 mm was manufactured in the same manner as in Example 1, except that only a first film reforming process was performed in a sulfuric acid solution in accordance with conditions of Comparative Example 1 of Table 2 below, and then physical properties thereof were evaluated.

Comparative Example 2

A cold-rolled sheet having a thickness of 0.1 mm was manufactured in the same manner as in Example 4, except that no film reforming process was performed in accordance with conditions of Comparative Example 2 of Table 2 below, and then physical properties thereof were evaluated.

Comparative Example 3

A cold-rolled sheet having a thickness of 0.1 mm was manufactured in the same manner as in Example 7, except that no film reforming process was performed in accordance with conditions of Comparative Example 3 of Table 2 below, and then physical properties thereof were evaluated.

TABLE 2

| | First film reforming process | | | Second film reforming process | | | Third film reforming process | | |
| --- | --- | --- | --- | --- | --- | --- | --- | --- | --- |
| | Concentration of sulfuric acid (g/l) | Temperature of sulfuric acid (□) | $|E_{cathode}| + |E_{anode}|$ | Concentration of sulfuric acid (g/l) | Temperature of sulfuric acid (□) | Current density ratio | Concentration of nitric acid (g/l) | Concentration of hydrofluoric acid (g/l) | Temperature of mixed acid (□) |
| Example 1 | 150 | 50 | 2.3 | 150 | 40 | 0.13 | 150 | 50 | 50 |
| Example 2 | 150 | 40 | 2.5 | 150 | 50 | 3.33 | 150 | 50 | 50 |

TABLE 2-continued

| | First film reforming process | | | Second film reforming process | | | Third film reforming process | |
|---|---|---|---|---|---|---|---|---|
| | Concentration of sulfuric acid (g/l) | Temperature of sulfuric acid (□) | $\|E_{cathode}\| + \|E_{anode}\|$ | Concentration of sulfuric acid (g/l) | Temperature of sulfuric acid (□) | Current density ratio | Concentration of nitric acid (g/l) | Concentration of hydro fluoric acid (g/l) | Temperature of mixed acid (□) |
| Example 3 | 150 | 45 | 2.5 | 150 | 30 | 1.22 | 150 | 50 | 50 |
| Example 4 | 150 | 50 | 2.5 | 150 | 55 | 0.13 | 150 | 50 | 50 |
| Example 5 | 150 | 50 | 2.5 | 150 | 55 | 3 | 150 | 50 | 50 |
| Example 6 | 150 | 70 | 2.3 | 150 | 65 | 2.5 | 150 | 50 | 50 |
| Example 7 | 150 | 70 | 2.4 | 150 | 65 | 1.2 | 150 | 50 | 50 |
| Example 8 | 150 | 70 | 2.4 | 150 | 50 | 0.79 | 150 | 50 | 50 |
| Example 9 | 150 | 70 | 2.4 | 150 | 40 | 0.45 | 150 | 50 | 50 |
| Comparative Example 1 | 150 | 70 | 2.3 | — | — | — | — | — | — |
| Comparative Example 2 | — | — | — | — | — | — | — | — | — |
| Comparative Example 3 | — | — | — | — | — | — | — | — | — |

Note: The header row shows 10 columns but table has subcolumn grouping; above I've aligned values to columns.

Table 2 shows surface reforming conditions of the ferrite-based stainless steel sheets manufactured according to Table 1 above. Referring to Table 2, it can be seen that only a first film reforming process was performed in the case of Comparative Example 1, and no film reforming process was performed in the cases of Comparative Examples 2 and 3.

TABLE 3

| | Ratio of Cr hydroxide/ Cr oxide | Surface roughness (μm) | Corrosion potential (V (SCE)) | Contact angle (°) |
|---|---|---|---|---|
| Example 1 | 0.52 | 0.49 | 0.31 | 69 |
| Example 2 | 0.6 | 0.22 | 0.35 | 62 |
| Example 3 | 0.7 | 0.13 | 0.33 | 31 |
| Example 4 | 0.75 | 0.09 | 0.4 | 22 |
| Example 5 | 0.82 | 0.18 | 0.45 | 42 |
| Example 6 | 0.9 | 0.14 | 0.37 | 67 |
| Example 7 | 1.2 | 0.12 | 0.35 | 62 |
| Example 8 | 1.5 | 0.08 | 0.4 | 61 |
| Example 9 | 1.6 | 0.051 | 0.41 | 64 |
| Comparative Example 1 | 0.4 | 0.7 | 0.05 | 77 |
| Comparative Example 2 | 0.2 | 0.04 | 0.1 | 88 |
| Comparative Example 3 | 0.1 | 0.02 | 0.15 | 91 |

Table 3 shows physical properties, i.e., a ratio of Cr hydroxide/Cr oxide, surface roughness, a corrosion potential, and a contact angle of the ferrite-based stainless steel sheets manufactured according to Tables 1 and 2.

The ratio of Cr hydroxide/Cr oxide was evaluated by measuring Cr hydroxide and Cr oxide included in a passivation film of each of the specimens according to the above examples by X-ray photoelectron spectroscopy (XPS) and converting the measured results.

The surface roughness was evaluated by measuring an average value ((surface roughness in a rolling longitudinal direction+surface roughness in a rolling transverse direction)/2) of surface roughness (Ra) measured in a rolling longitudinal direction and a rolling transverse direction using an atomic force microscope (AFM).

The corrosion potential was evaluated by immersing each of the steel plate materials having a thickness of 0.1 mm in a mixture of a 1M sulfuric acid solution and a 2 ppm hydrofluoric acid solution, which is a fuel cell operating environment, at 70 □ and measuring a potential of each material with respect to a saturated calomel electrode (SCE) as a reference electrode.

The contact angle was evaluated by cutting each of the specimens according to the above examples into an area of 20 cm², dropping 3 μl of distilled water in the form of droplets on a surface of each specimen at room temperature by using a DSK 10-MK2 apparatus manufactured by KRUSS GmbH, and measuring a contact angle thereof with respect to the surface of each specimen.

Figure 5:
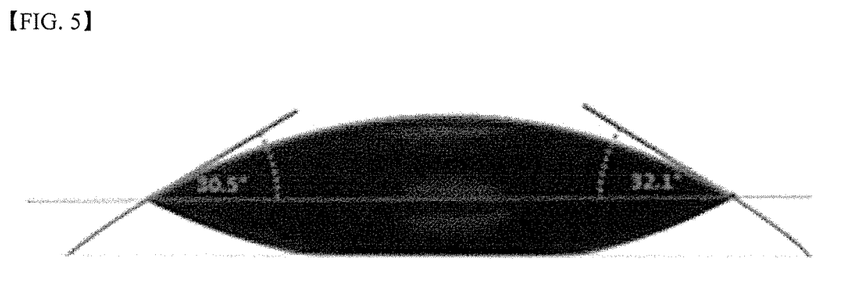
FIGS. 5 and 6 are images showing measured contact angles of a water droplet with respect to a surface of each of the stainless steels for a separator of a polymer electrolyte membrane fuel cell according to embodiments of the present invention.
Figure 6:
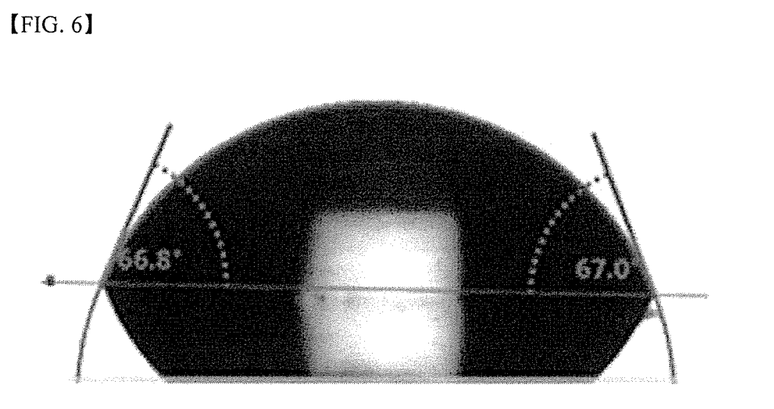
Figure 7:
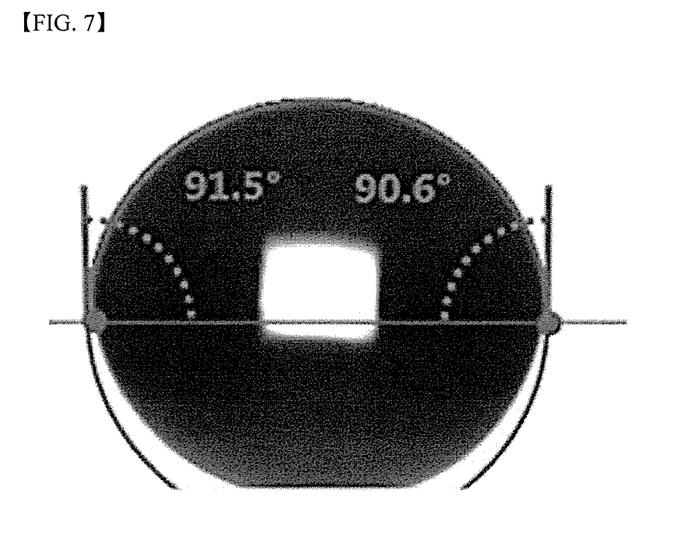
FIG. 7 is an image showing measured contact angles of a water droplet with respect to a surface of stainless steel for a separator of a polymer electrolyte membrane fuel cell according to a comparative example.

FIGS. 5 and 6 are images showing measured contact angles of a water droplet with respect to a surface of each of the stainless steels for a separator of a polymer electrolyte membrane fuel cell according to embodiments of the present invention. FIG. 7 is an image showing measured contact angles of a water droplet with respect to a surface of stainless steel for a separator of a polymer electrolyte membrane fuel cell according to a comparative example.

FIG. 5 is an image showing measured contact angles of the stainless steel sheet manufactured according to Example 3, and FIG. 6 is an image showing measured contact angles of the stainless steel sheet manufactured according to Example 6. Referring to FIGS. 5 and 6, it can be seen that the stainless steel sheets according to embodiments of the present invention have a contact angle of 70° or less.

In contrast, FIG. 7 is an image showing measured contact angles of the stainless steel sheet manufactured according to Comparative Example 3. Referring to FIG. 7, it can be seen that the contact angles of the stainless steel sheet having not gone through a film reforming process exceed 70°.

As described above, when compared to the cases of comparative examples, in the stainless steel for a separator of a polymer electrolyte membrane fuel cell, manufactured according to the embodiments of the present invention, a non-conductive brightly-annealed passivation film is removed through the first film reforming process, the percentage of Cr on the surface of the stainless steel is increased through the selective elution of Fe in the second film reforming process, and in the third film reforming process, the remaining insoluble Si oxide is removed and a Cr-rich conductive film is formed, through immersion in a mixed acid solution including nitric acid and hydrofluoric acid, and accordingly, a finally reformed passivation film may be provided. In addition, hydrophilicity may be enhanced by adjusting the contact angle to 70° or less through controlling of the ratio of Cr hydroxide/Cr oxide of the reformed passivation film, and thus when the stainless steel is applied to a separator of a fuel cell, water discharge characteristics may be enhanced, thus preventing the occurrence of a flooding phenomenon.

That is, according to stainless steel according to an embodiment of the present invention, both hydrophilicity and corrosion resistance may be secured even without separate surface treatment such as surface coating of the stainless steel for a separator of a polymer electrolyte membrane fuel cell.

While the present invention has been described in detail with reference to exemplary embodiments, these embodiments are not intended to limit the scope of the present invention. In addition, it will be understood by those of ordinary skill in the art that various changes in form and details may be made therein without departing from the spirit and scope of the present invention.

INDUSTRIAL APPLICABILITY

Stainless steel for a separator of a fuel cell according to embodiments of the present invention and a method of manufacturing the same are applicable to a separator for a polymer electrolyte membrane fuel cell.

The invention claimed is:

1. A stainless steel for a separator of a polymer electrolyte membrane fuel cell, the stainless steel comprising, based on wt %, greater than 0% to 0.02% of C, greater than 0% to 0.02% of N, greater than 0% to 0.25% of Si, greater than 0% to 0.2% of Mn, greater than 0% to 0.04% of P, greater than 0% to 0.02% of S, 20% to 34% of Cr, greater than 0% to 0.6% of V, greater than 0% to 0.5% of Ti, greater than 0% to 0.5% of Nb, and the remainder, Fe and other unavoidable impurities,
wherein a ratio of Cr hydroxide/Cr oxide included in a passivation film of the stainless steel is more than 0.7 to 1.7, and the passivation film has a contact angle (θ) of 70° or less,
wherein the stainless steel has a surface roughness (Ra) of 0.02 μm to 0.5 μm.

2. The stainless steel of claim 1, wherein the surface roughness (Ra) is an average value of surface roughness in a rolling longitudinal direction and surface roughness in a rolling transverse direction.

3. The stainless steel of claim 1, wherein the stainless steel further comprises 0.05% to 2.5% of Mo.

4. The stainless steel of claim 1, wherein the passivation film has a thickness of 3.5 nm or less (excluding 0).

5. The stainless steel of claim 1, wherein the passivation film has a corrosion potential of 0.3 V (SCE) or more.

6. A method of manufacturing a stainless steel for a separator of a polymer electrolyte membrane fuel cell, the method comprising: manufacturing a stainless steel sheet by performing cold rolling on stainless steel, the stainless steel comprising, based on wt %, greater than 0% to 0.02% of C, greater than 0% to 0.02% of N, greater than 0% to 0.25% of Si, greater than 0% to 0.2% of Mn, greater than 0% to 0.04% of P, greater than 0% to 0.02% of S, 20% to 34% of Cr, greater than 0% to 0.6% of V, greater than 0% to 0.5% of Ti, greater than 0% to 0.5% of Nb, and the remainder, Fe and other unavoidable impurities;
a heat treatment process of forming a first passivation film on a surface of the stainless steel sheet by performing bright annealing on the stainless steel sheet; and a film reforming process of forming a second passivation film on the surface of the stainless steel sheet by reforming the first passivation film, wherein a ratio of Cr hydroxide/Cr oxide included in the second passivation film is more than 0.7 to 1.7, and the second passivation film has a contact angle (θ) of 70° or less,
wherein the film reforming process comprises:
a first film reforming process of performing electrolytic treatment in a sulfuric acid solution at a first current density;
a second film reforming process of performing electrolytic treatment in the sulfuric acid solution at a second current density, the second current density being equal to or less than the first current density; and
a third film reforming process performed by immersion in a mixed acid solution comprising nitric acid and hydrofluoric acid.

7. The method of claim 6, wherein the first film reforming process and the second film reforming process are consecutively performed.

8. The method of claim 6, wherein in the first film reforming process, a potential of the stainless steel sheet, corresponding to the first current density, satisfies Equations 1 and 2 below:

$$E_{cathode} \geq 1.0 \qquad (1)$$

$$|E_{cathode}| + |E_{anode}| \geq 2.0 \qquad (2)$$

wherein the unit of the potential of the stainless steel sheet is volt (V).

9. The method of claim 6, wherein in the first film reforming process and the second film reforming process, a concentration of the sulfuric acid solution ranges from 50 g/l to 300 g/l, and a temperature of the sulfuric acid solution ranges from 40° C. to 80° C.

10. The method of claim 6, wherein in the third film reforming process, a concentration of the nitric acid in the mixed acid solution ranges from 100 g/l to 200 g/l, a concentration of the hydrofluoric acid is 70 g/l or less, and a temperature of the mixed acid solution ranges from 40° C. to 60° C.

* * * * *